United States Patent [19]

Lee

[11] 4,063,652
[45] Dec. 20, 1977

[54] TIER PATTERN SEQUENCE ACTIVATION MEANS

[75] Inventor: Robert W. Lee, Fresno, Calif.

[73] Assignee: Sperry Rand Corporation, New Holland, Pa.

[21] Appl. No.: 715,772

[22] Filed: Aug. 19, 1976

[51] Int. Cl.² ................. A01D 87/12; B65G 57/32
[52] U.S. Cl. ................................. 214/6 B; 214/6 P
[58] Field of Search ................. 214/6 B, 6 P, 6 C; 198/374

[56] References Cited

U.S. PATENT DOCUMENTS

| | | | |
|---|---|---|---|
| 3,289,859 | 12/1966 | Tarbox | 214/6 B |
| 3,446,369 | 5/1969 | May et al. | 214/6 B |
| 3,446,370 | 5/1969 | Clendenin et al. | 214/6 B |
| 3,549,023 | 12/1970 | Backman | 214/6 B |
| 3,901,393 | 8/1975 | Butler et al. | 214/6 B |

Primary Examiner—L. J. Paperner
Attorney, Agent, or Firm—John R. Flanagan; John B. Mitchell; Frank A. Seemar

[57] ABSTRACT

Tier pattern selection on the disclosed bale wagon involves periodic rotation of a memory element in the form of a cam plate relative to a cam follower which is connected to means on the bale wagon which will cause the tier pattern selected to be formed. The cam plate is rotated through successive predetermined displacements to successively bring respective peripheral lobes on the cam plate into engagement with the cam follower in a desired sequence. Improved means facilitate accurate rotation of the cam plate and include an electric motor drivingly interconnected to a sprocket mounted on the cam plate shaft, a series of switches and circuitry which interconnects the motor with an electrical power source on the bale wagon. Closing and opening of the circuitry is controlled during normal operation of the bale wagon by certain of the switches so as to cause rotation of the cam plate after each tier selected has been formed and delivered to the load bed of the bale wagon until the cam follower becomes disposed at the next successive position along the cam plate lobes.

16 Claims, 9 Drawing Figures

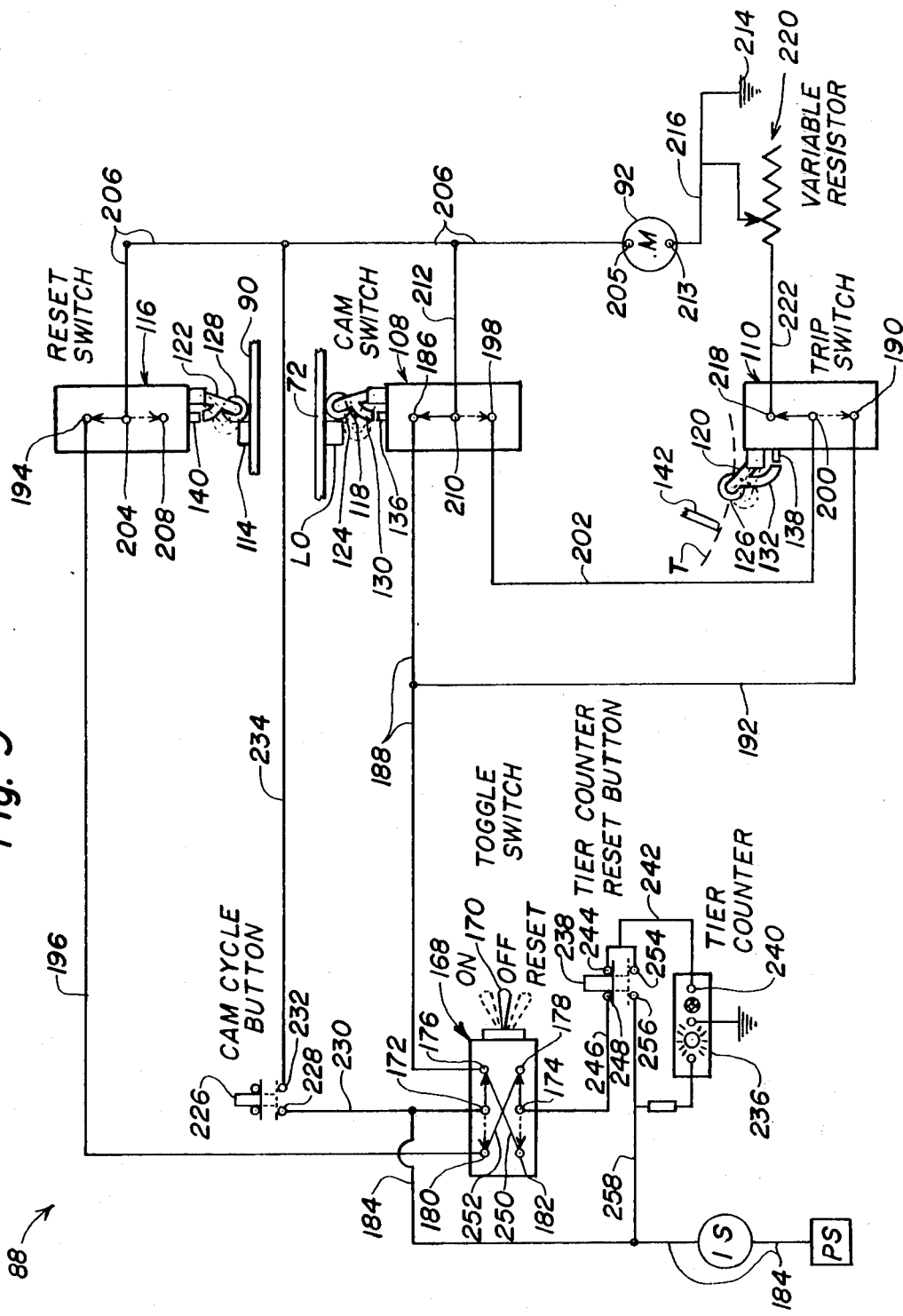

TIER PATTERN SEQUENCE ACTIVATION MEANS

BACKGROUND OF THE INVENTION

1. Field of the Invention

The present invention generally relates to the art of forming a stack of crop material bales and, more particularly, is concerned with a bale wagon incorporating improved features for facilitating the formation of a block-type, tied or interlocked stack of bales thereon.

2. Description of the Prior Art

The present invention provides apparatus on a bale wagon for more consistently facilitating accurate selection of the desired sequence of tier patterns which will comprise the stack to be formed by the bale wagon. Such apparatus constitutes an alternative to, and under some conditions an improvement over, the load position sensing apparatus illustrated and described in U.S. Pat. No. 3,927,771 which issued Dec. 23, 1975 to Lee D. Butler and Edward J. Wynn and is assigned to the same assignee as the present invention.

The bale wagon disclosed in the aforesaid patent utilizes tier pattern sequence storage means in the form of a cam plate having a continuous peripheral edge on which is defined successive lobes which each correspond to, or represent, either a standard tier pattern or one of two different tie tier patterns into which bales that will form the stack are to be arranged. The lobes are arranged about the periphery of the cam plate in a sequence which corresponds to the desired sequence of the three basic tier patterns within the desired stack pattern. Such cam plate, constituting the memory of the bale wagon, is adjustably fixed on the upper end of a shaft which is rotatably mounted in a support assembly located below the rear end of the second table of the bale wagon.

Activation of the bale wagon memory is represented by rotation of the cam plate. Rotation of the cam plate successively disposes its peripheral lobes into contact with a cam follower. The cam follower in effect receives an instruction from the memory of the bale wagon, that being the lobe arrangement on the cam plate, and initiates transmission of that instruction to other operative parts of the bale wagon in order that a desired one of the tier patterns will be formed on the second table and delivered by the second table to the load bed of the bale wagon.

The lobes of the cam plate which respectively correspond to the three basic tier patterns are in the shape of arcs respectively struck by radii of different lengths from a common axis of revolution. Thus, each of the instructions received by the cam follower from the bale wagon memory is represented by the position of the cam follower along one of the three arcs forming the lobes and thus at one of three possible radial distances from the center of the cam plate.

It is important that the cam plate be accurately activated or rotated relative to the cam follower so that successive instructions (lobes) representing the desired sequence of tier patterns will be received by the cam follower. Under normal conditions, accurate sequential rotation of the cam plate with respect to the cam follower, such that the cam follower is successively positioned on the lobes arranged on the cam plate, may be achieved by accurate sensing of successive stack movements and positions along the load bed of the bale wagon during stack formation. Since, under normal conditions, the bales being stacked commonly have dimensions of 16 × 23 × 46 inches, the angular displacement between the lobes about the cam plate periphery may be designed to be proportionate to the various sequence of 16 and 23 inch dimensions of the stack tiers.

The features on the bale wagon disclosed in the aforesaid patent for sequentially rotating the cam plate in response to stack movements on the load bed are the rolling rack which supports the rear of the stack on the load bed, its hydraulic cylinder and the hydraulic circuitry associated therewith, a cable drum fixed on the rotatable shaft which also mounts the cam plate and motion transmitting means in the form of cables being routed along an endless path and interconnecting the rolling rack cylinder and the cable drum. Thus, as successive tiers are delivered by the second table to the front end of the load bed, the tier or tiers already standing upright on the load bed are moved toward the rear end of the load bed through a distance equal to the width of the flat (23 inches) or edge (16 inches) side of the bales, depending upon which of the sides of the bales is oriented in the horizontal plane, and, concurrently therewith, the rolling rack is moved through the same distance toward the rear end of the load bed. The hydraulic circuitry associated with the rolling rack cylinder insures that the rolling rack does not overrun. Thus, the rolling rack will only be moved through a distance equal to the bale width of the respective tier being delivered to the load bed and thereby the desired angular rotational displacement of the cam plate, being proportional to such bale width, will be transmitted to the cam plate via the cables and the cable drum.

From the above discussion, it will be realized that, under normal conditions when handling 16 × 23 × 46 bales, rotation of the cam plate will automatically, and can only, occur upon addition or delivery of a tier of bales to the load bed and thus its accurate rotative sequencing through the exact desired distance is guaranteed. Thus eliminated is the necessity of counting second table cycles in order to know when to form a tie tier pattern and also the possibility of getting the cam plate out of its desired sequence should the empty second table be inadvertently cycled to its upper position.

However, due to variations in crop conditions some bales will expand and then be more than 16 inches in width. Further, some commercial balers make bales that are 16½ to 17 inches wide. Thus, since the rotational displacement of the cam plate is proportional to the rearward displacement of the rolling rack and the rolling rack will be moved through a distance equal to the bale width of the respective tier being delivered to the load bed, when the bale width exceeds 16 inches the cam plate is successively over-rotated such that successive lobes on the cam plate progressively become increasingly more misaligned with the cam follower until an undesirable situation arises where the cam plate fails to provide the proper instruction to the cam follower with the result that the other operative parts of the bale wagon will not be correctly instructed as to which one of the tier patterns is to be formed next on the second table.

To summarize, while the use of the load position sensing apparatus disclosed and claimed in the aforesaid patent has proven to be a highly satisfactory method under normal conditions for accurately sequencing the cam plate, the above-noted undesirable situation has been encountered with such apparatus under the above-described deviations from normal conditions.

SUMMARY OF THE INVENTION

The bale wagon disclosed herein incorporates improved means in the form of apparatus which periodically activates the cam plate so as to more consistently facilitate accurate selection of the desired sequence of tier patterns which will comprise the stack to be formed by the bale wagon and to do so under a wider range of crop conditions than the load position sensing and activating apparatus of U.S. Pat. No. 3,927,771.

The apparatus of the present invention no longer utilizes the cable drum and motion transmitting cable of the prior apparatus which translated load bed rolling rack movement and position into cam plate rotation and angular position relative to the cam follower. Instead, the improved apparatus herein disclosed will effectuate desired rotation of the cam plate relative to the cam follower whenever a suitable control is operated or whenever complete pivotal movement of the second table from its lower, to its upper and back to its lower position is sensed.

Consequently, it is seen that through utilization of the improved apparatus of the present invention, in place of the previous load position sensing and activating apparatus, the achievement of accurate cam plate rotation is not dependent upon, or subject to, a particular width dimension of the bales being stacked. On the other hand, since the improved apparatus is also tied in with second table movement, if, during normal operation of the bale wagon, the second table is pivoted through its full cycle when empty, then the cam plate will be rotated so as to advance it out of the desired tier pattern sequence. However, the improved apparatus of the present invention includes manual control means to reset the cam plate back into proper sequence.

Furthermore, a tier counting component may be operatively associated with the improved aparatus to more readily facilitate the carrying out of the steps necessary to reset the cam plate back into sequence. The above component comprises the improvement invention claimed in a co-pending application, which is cross-referenced above; however, it is also illustrated and described herein for facilitating a complete and thorough understanding of electro-mechanical means comprising the present invention.

Accordingly, the present invention broadly relates to improved apparatus incorporated in a bale wagon having operable means for forming bales into a plurality of tier patterns, such as standard and tie tier patterns, and means for storing a predetermined sequence of the plurality of tier patterns, the storing means defining a plurality of successive-displaced positions which each represent one of the tier patterns, the operable means responsive to each of the storing means positions to form the bales into the one of the tier patterns corresponding to each of the storing means positions. The improved apparatus comprises a source of power, preferably electrical power, drive means activatable, preferably electrically, for rendering the operable means successively responsive to each of the storing means positions, and means, preferably electro-mechanical, for operatively interconnecting the power source to the drive means so as to cause activation of the drive means and render the operable means responsive to at least a predetermined one of the storing means positions.

More particularly, the bale wagon includes tier-accumulating means, the operable means is also for adding the formed tier to the tier-accumulating means, and the electro-mechanical means operatively interconnects the power source to the drive means in response to the addition of each of the tiers of bales to the tier-accumulating means. Also, the predetermined one of the storing means positions may be either the one which constitutes a starting position or the next successive one of the storing means positions following the one of the storing means positions to which the operable means was previously rendered responsive.

Furthermore, the bale wagon includes means coupled to the operable means and associated with the storing means, the coupled and associated means being responsive to each of the storing means positions to cause the operable means to form the bales into the one of the tier patterns corresponding to each of the storing means positions and to add the tier to the tier-accumulating means. Also, the electro-mechanical means includes circuitry interconnecting the electrical power source and the drive means for transmitting electrical energy from the former to the latter to activate the latter, first means for opening the circuitry in response to disposal of the coupled and associated means at the predetermined one of the storing means positions so as to prevent the transmission of electrical energy to the drive means, and second means for selectively closing the circuitry so as to allow the transmission of electrical energy to the drive means to activate the same until the first means opens the circuitry when the coupled and associated means is disposed at the predetermined one of the storing means positions.

Still more particularly, the storing means takes the form of a rotatable cam having a peripheral arrangement of lobes which define the plurality of successive positions with a series of protruding lugs on the cam successively displaced one from the next in proportion to the successive displacements between the positions defined by the lobes of the cam and which move in a predetermined path as the cam rotates. The coupled and associated means includes a cam follower disposed adjacent the cam and engaged with one of the lobes thereof. A switch in the aforementioned circuitry is mounted adjacent the cam and includes an arm pivotally mounted so as to be disposed in the path of the cam lugs. When the arm is engaged by each of the lugs during rotation of the cam, the switch opens the circuitry which de-activates the drive means and terminates rotation of the cam. The circuitry is closed to cause activation of the drive means and rotation of the cam either as a result of selective operation of another manually-actuatable switch in the circuitry or still another switch in the circuitry which has a pivotally mounted arm disposed in the path of a trip finger which pivots through the path to engage the arm when a tier is added to the tier-accumulating means.

Still further, a reset switch is provided in the circuitry and has a pivotally-mounted arm disposed in the path of a single lug mounted on a drive transmission sprocket which operatively interconnects the drive means with the rotatable cam. When this arm is engaged and moved during concurrent rotation of the cam and drive sprocket, the switch opens the circuitry to terminate rotation of the cam. The lug on the sprocket is disposed relative to the cam such that the lug engages the switch arm when the cam follower is disposed in the one of the positions defined by the cam lobes which constitutes a starting position.

Other details, advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 9 is a schematic represention of the electrical circuitry and electro-mechanical components for controlling the successive disposal of the cam follower at each of its successive positions along the lobes of the cam.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not be construed as limiting terms.

IN GENERAL

Figure 1:
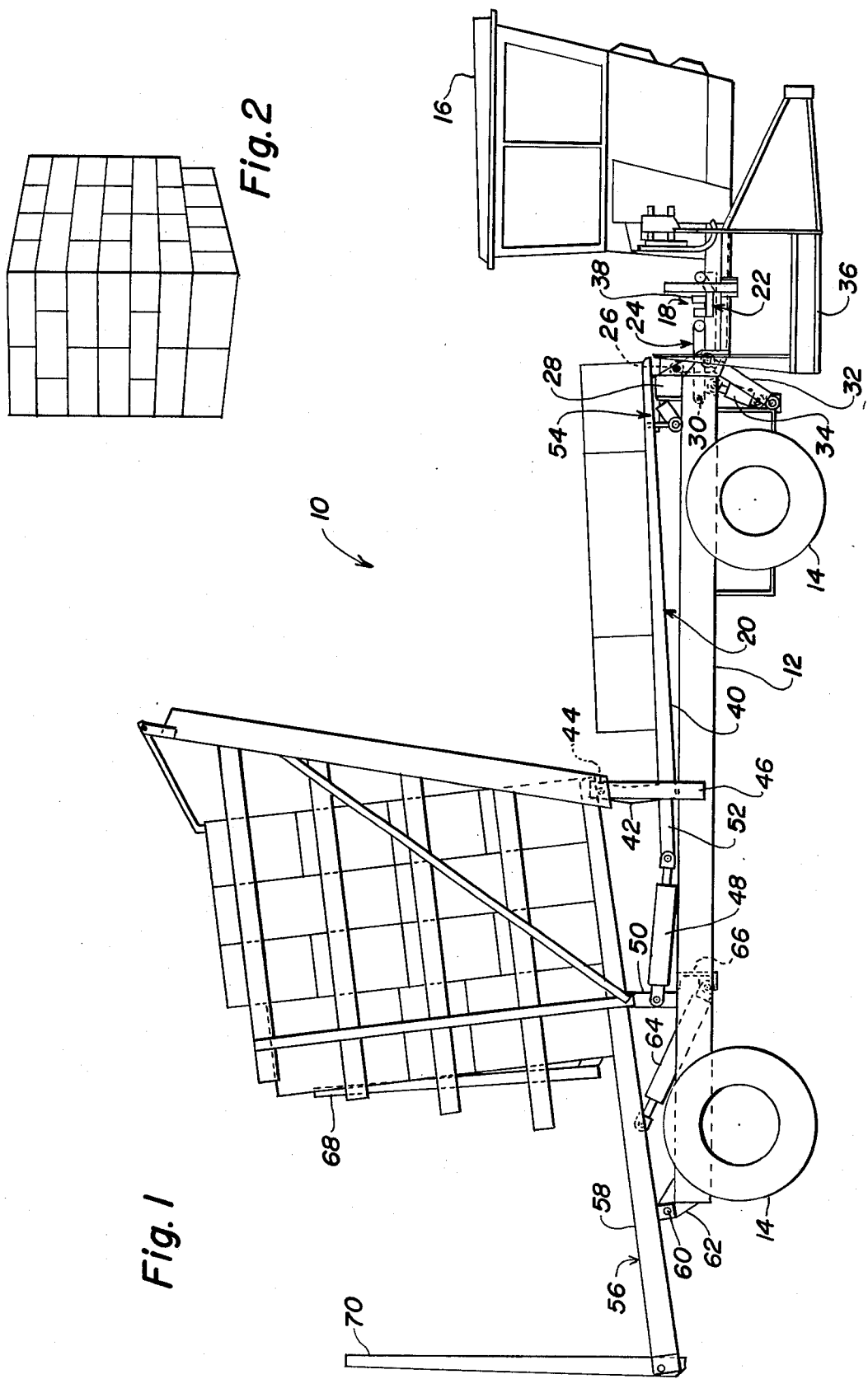
FIG. 1 is a side elevational view of a bale wagon embodying the principles of the present invention, showing the bale wagon with a partially formed block-type stack of bales on its load bed and during formation of a tier of bales on its second tier forming table.
Figure 2:
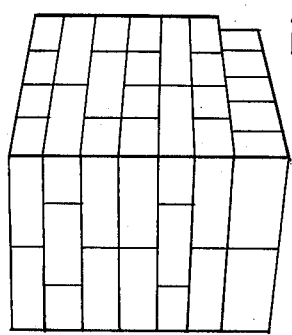
FIG. 2 is a perspective view of the standing block-type stack on a smaller scale than that of FIG. 1, showing the stack after it has been deposited upright on the ground or the like by the bale wagon of FIG. 1, with the bales of the lowermost tier resting on one of their edge sides and the bales of the remaining tiers resting on one of their flat sides.

Referring now to the drawings, and particulaly to FIG. 1, there is shown a bale wagon, being indicated generally by the numeral 10, for forming a block-type, tied or interlocked stack of bales, as shown in FIG. 2, which wagon 10 incorporates the preferred embodiment of the improvement provided by the present invention.

The bale wagon 10 is provided with a mobile chassis formed of left and right longitudinally extending channels 12 (only the right channel being shown), suitably interconnected by spaced transverse channels (not shown), and front and rear parts of wheels 14, only the right front and rear wheels of each pair being shown in FIG. 1, for movably supporting the interconnected channels 12. On the forward ends of the channels 12 is mounted a cab 16 for housing the operator and various controls for the wagon. A source of power, such as a engine (not shown) is suitably mounted on the chassis for driving, preferably, the rear pair of wheels 14. Although the wagon illustrated is a self-propelled type, it could readily take the form of a pull-type wagon with the forward ends of the channels 12, instead of mounting the cab 16, converging in an assembly which would adapt the wagon to be secured to a tractor, or other towing vehicle, located at the front of the wagon.

Mounted near the forward end of the mobile chassis, immediately rearwardly of the cab 16, and extending transversely thereto is means for receiving bales, generally indicated by the numeral 18 and hereinafter referred to as the first, bale-receiving table of the wagon 10. The first table 18 is positioned adjacently along and generally below a bale-supporting area defined by means hereinafter referred to as the second, tier-forming table of the wagon 10, generally indicated by the numeral 20.

The first table 18 generally includes first and second structures, generally designated 22, 24 respectively, which receive and support the bales. The first structure 22 is pivotally secured at 26 between spaced-apart upstanding front brackets 28 (only the right one being seen in FIG. 1) being mounted on the longitudinal channels 12. The second structure 24 is pivotally secured at 30 between the upstanding brackets 28 generally below, inwardly from, and rearwardly of, the pivotal securement of the first structure 22 at 26 to the brackets 28. Actuable means in the form of first and second hydraulic cylinders 32, 34 are provided for selectively operating structures 22, 24 of the first table 18 in either one of two modes to lift the bale or bales received thereon on their flat sides upwardly and deposit the same on the bale-supporting area of the second table 20 on either one of the edge or flat sides of the bales. Since the construction of the first table 18 and the components for operating it in either one of its two modes are illustrated and described in U.S. Pat. No. 3,923,176 following the headings "Preferred Form of the Improved First Table" and "Two Modes of Operation of Improved First Table," such disclosure need not be repeated herein but instead is incorporated by reference to the aforesaid patent. This patent issued to Edward J. Wynn et al on Dec. 2, 1975 and is assigned to the assignee of the present invention.

It will be understood by those skilled in the art, that the bales are first introduced to the first table 18 by means of a bale loader or pickup, generally indicated at 36, which is mounted to the chassis at the right end of the table 18 and operative to lift bales, resting on one of their edge sides, from the ground and direct them through a generally 90 degree arcuate lateral path to the right receiving end of the table 18. The loader 36 is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 38 is operatively mounted to the chassis and longitudinally extends along and above the bale supporting portions of first and second structures 22, 24 of the first table 18 from approximately the right receiving end to near the middle thereof for moving the bales laterally from the loader 36 toward the left end of the first table 18. The cross conveyor 38 is generally similar to the one illustrated and described in the aforementioned U.S. patent and need not be illustrated and described in detail herein for a thorough and clear understanding of the present invention.

The second, tier-forming table 20 is formed by an L-shaped structure having a forwardly extending leg portion 40 across which is defined the area which provides a surface upon which bales are supported and formed into a tier and an upwardly extending rear leg portion 42 which is pivotally secured at 44 between spaced apart upstanding brackets 46 (only the right one being shown in FIG. 1) being mounted on the longitudinal channels 12. A hydraulic cylinder 48 is pivotally secured at its anchor end to a frame member 50 mounted between the longitudinal channels 12. The rod end of the hydraulic cylinder 48 is pivotally secured to the free end of an arm portion 52 which is fixedly secured to, and extends rearwardly from, the L-shaped structure of the second table 20.

When the second table 20 is in its normal horizontal tier-forming position, as shown in FIG. 1, it rests at its forward end on a transverse support member, not shown, fixed to front bracket 28. When the requisite number of bales have been accumulated and formed on the second table 20 in a suitable manner into either a standard tier pattern or a double rail or center rail tie tier pattern (see respectively FIGS. 23 through 26 of U.S. Pat. No. 3,945,507) through utilization of a tie spike mechanism 54, being similar to that disclosed in aforementioned U.S. Pat. No. 3,395,814, mounted to the transverse support member and positioned below the second table 20, the hydraulic cylinder 48 is actuated by suitable trip means (not shown) via suitable hydraulic controls so that it extends and causes the table 20 to swing or pivot upwardly generally 90 degrees about its pivot point 44 to a generally vertical position adjacent the front end of a rearwardly disposed load bed, or third load table, being generally indicated by the numeral 56. In this manner, the tier of bales formed on the second table 20 is transferred to the load bed 56.

Since the tie spike mechanism 54 and other operable components for forming either one of the aforementioned types of tier patterns on the second table 20 are illustrated and described in aforementioned U.S. Pat. No. 3,945,507 following the headings "Tier Pattern Formation" and "Three Modes of Operation of Means for Tier Pattern Formation," such disclosure need not be repeated herein but instead is incorporated by reference to the aforesaid patent. This patent issued to James A. Olsen et al on Mar. 23, 1976 and is assigned to the assignee of the present invention.

The load-carrying bed 56 includes a platform assembly 58 which is pivotally mounted at 60 between spaced apart upstanding rear brackets 62 (only the right one being shown in FIG. 1) being mounted on the longitudinal channels 12. A pair of spaced apart hydraulic cylinders 64 (only the right one being shown) are pivotally secured at their anchor ends to transverse frame member 66 being fixed between channels 12 and at their rod ends to the platform assembly 58. When the load bed 56 is in its normal, generally horizontal tier-receiving position, as shown in FIG. 1, it rests at its forward end on upstanding brackets 46. A stack of bales is progressively formed on the load bed 56 upon successive delivery thereto of tiers of bales by pivotal movement of the second table 20 from its normal horizontal tier-forming position of FIG. 1 to its generally upright position adjacent the forward end of the load bed 56.

As the first tier of bales is delivered or deposited onto the load bed 56, a rolling rack for supporting the rear of the load being formed on the load bed 56, being generally indicated by the numeral 68 and longitudinally movable rearwardly along the load bed by the load being formed and forward by a hydraulic cylinder (not shown), is contacted by the tier and forced to move rearwardly along the load bed 56 against the residual holding pressure of the hydraulic cylinder. It will be understood by those skilled in the art, that while the rolling rack 68 is held by hydraulic pressure at the position to which it has been moved along the load bed 56, the pressure of the rolling rack cylinder is overcome with the delivery of each successive tier of bales from the second table 20 to the front end of the load bed 56 whereby the rolling rack 68 is forced to move rearwardly one bale width until the rack 68 reaches a generally rearmost position along the load bed 56, depending upon the desired number of tiers forming the stack, whereupon a complete stack has been formed on the load bed 56.

The structure and function of the rolling rack 68, its hydraulic cylinder (not shown) and associated hydraulic circuitry (not shown) form no part of the present invention and need not be illustrated and described in detail herein for a thorough and clear understanding of the present invention. For a complete understanding of such components, reference may be had to U.S. Pat. No. 3,927,771.

When the load bed 56 has been loaded with the desired number of tiers, the stack can be transferred to the ground in the form of a composite stack by extension of the hydraulic cylinders 64 which casue the load bed 56 to pivot generally 90° about point 60 from its generally horizontal position of FIG. 1 to an upright position in which the rolling rack 68 and the rear end of the load bed 56 which mounts additional upright support tines 70 are disposed adjacent the ground.

TIER PATTERN SEQUENCE STORAGE MEANS

The preferred pattern of the stack to be formed on the load bed 56 of the bale wagon 10 is shown in FIG. 2.

Each of the bale tiers forming the preferred stack pattern of FIG. 2 is in one of three basic patterns. One basic pattern is the standard tie tier pattern (see FIGS. 23 and 24 of U.S. Pat. No. 3,945,507). The first, second, fourth and seventh tiers up from the bottom of the FIG. 2 stack are in the standard tier pattern. Another basic pattern is the double rail tie tier pattern (see FIG. 25 of U.S. Pat. No. 3,945,507). The third and sixth tiers up from the bottom of the FIG. 2 stack are in the double rail tie tier pattern. The last basic pattern is the center rail tie tier pattern (see FIG. 26 of U.S. Pat. No. 3,945,507). The fifth tier up from the bottom of the FIG. 2 stack is in the center rail tie tier pattern.

Figure 3:
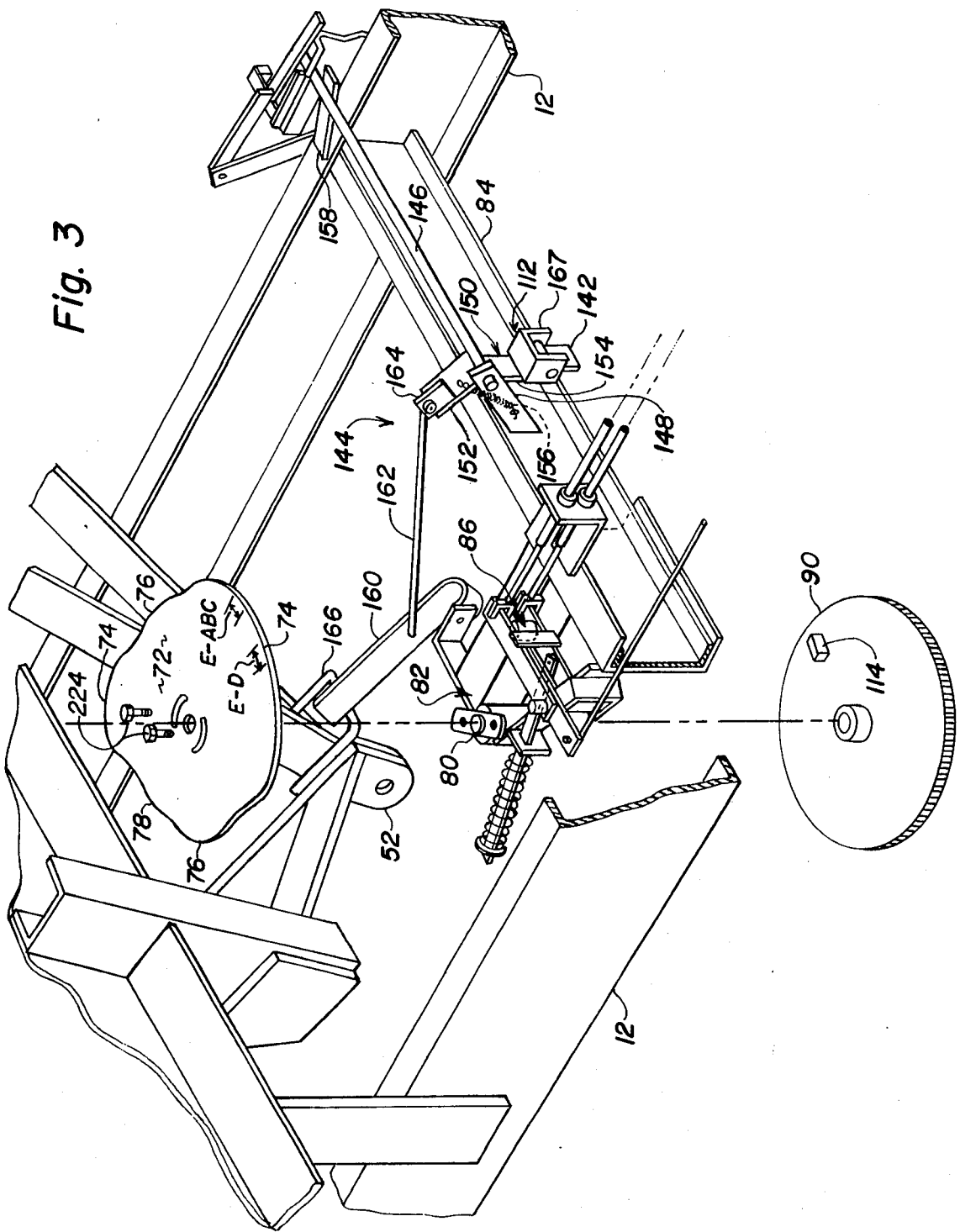
FIG. 3 is an enlarged, exploded perspective view of a second table actuating mechanism, and a storage cam, a driven sprocket and associated components for tier pattern sequence storage and selection, located below the second table of the bale wagon of FIG. 1, as seen when standing along the right side of the wagon.
Figure 4:
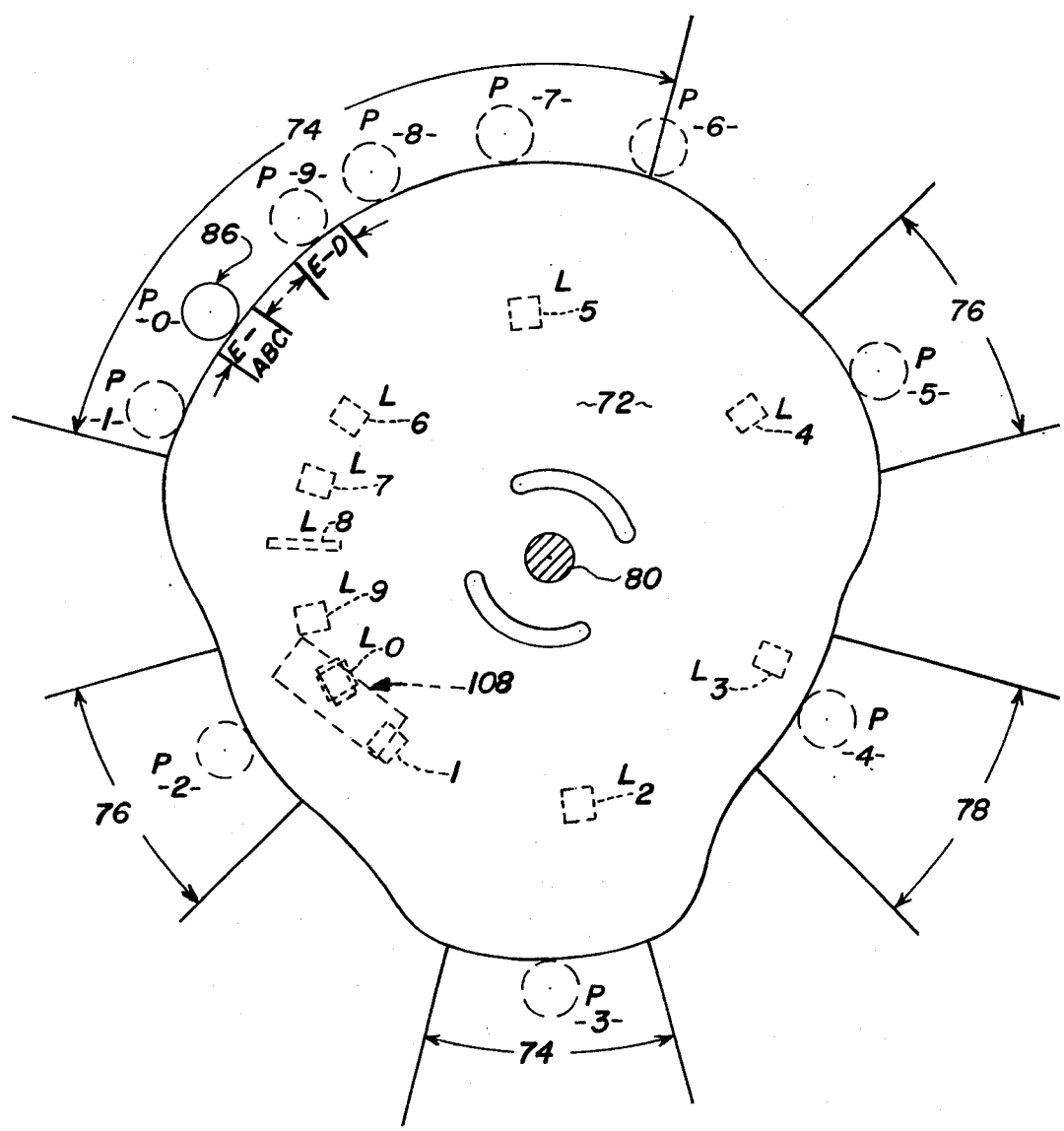
FIG. 4 is an enlarged plan view of the cam of FIG. 3 for storing tier pattern sequences, illustrating the various initial and subsequent successive positions along the periphery of the cam at which a cam follower will be located during the formation of the various tier patterns of the various stack patterns by the bale wagon and illustrating the series of lobes of the cam which define the successive positions of the cam follower, as well as the series of lugs mounted on the underside of the cam which each actuate a cam switch to effectuate a desired positional relationship between the cam and cam follower.

The tier pattan sequence of the stack pattern of FIG. 2 is stored on means which provides a memory for the bale wagon 10. Such means is in the form of a storage cam plate 72, as seen in FIGS. 3 and 4. The cam plate 72 has an overall configuration which is substantially the same as that illustrated in aforementioned U.S. Pat. No. 3,945,507.

Referring to FIGS. 3 and 4, the cam plate 72 is seen having a continuous peripheral edge on which is defined several lobes 74,76,78 which each correspond to or represent, one of the standard or tie tier patterns and are arranged about the periphery of the cam plate 72 in a sequence which corresponds to the desired sequence of the three basic tier patterns within the preferred stack pattern. Lobe 74 represents a standard tier pattern, lobe 76 represents a double rail tie tier pattern, and lobe 78 represents a center rail tie tier pattern. The lobes are generally in the shape of arcs which are respectively struck by radii of different lengths and having a common axis of revolution.

The cam plate 72 is adjustably fixed on the upper end of a shaft 80 which is rotatably mounted in a support assembly, generally indicated as 82, being located below the rear end of the second table 20 and mounted on the rear side and adjacent the right end of a transverse frame member 84 extending between the longitudinal channels 12 of the chassis. The axis of rotation of the cam plate 72 and the shaft 80 is common with the axis of revolution of the arcs defining lobes 74,76,78 on the cam plate periphery.

It should also be mentioned that not only are the lobes 74,76,78 arranged, and displaced both circumferentially and radially from one another, about the cam plate periphery to store the sequence of the three basic tier patterns for the preferred stack pattern of FIG. 2, but also to store respective sequences for three alternative stack patterns, being shown in FIGS. 49, 50 and 51 in aforementioned U.S. Pat. No. 3,945,507. Thus, four different stack patterns are stored in the memory of the bale wagon 10.

Prior to beginning formation of one of the four different stack patterns on the bale wagon 10, the cam plate 72 must be adjusted about the shaft 80 such that one of the positions E-ABC or E-D being indicated on the cam plate 72 in FIGS. 3 and 4, which corresponds to the stack pattern to be formed, is aligned with a cam follower, indicated as 86 in FIGS. 3 and 4. The cam follower 86 is the element on the bale wagon 10 which receives instruction from the memory of the bale wagon, that being, the lobe arrangement on the cam plate 72, and initiates transmission of that instruction to other operative components on the bale wagon in order that a desired one of the three tier patterns will be formed on the second table 20 and delivered by the second table 20 to the load bed 56. It has been mentioned that the lobes 74,76,78 are respectively in the shape of arcs respectively struck by radii of different lengths from a common axis of revolution. Thus, the instruction received by the cam follower 86 from the bale wagon memory is represented by the position of the cam follower 86 along one of the three arcs forming the lobes and thus at one of three possible radial distances from the center of the cam plate 72. Also, it will be readily understood that activation of the bale wagon memory is represented by rotation of the cam plate 72 to bring a particular one of the lobes into engagement with the cam follower 86.

ELECTRO-MECHANICAL TIER PATTERN SEQUENCE ACTIVATION MEANS

Means must be provided for periodically activating, i.e. rotating, the cam plate 72 relative to the cam follower 86 through successive predetermined angular displacements so as to successively bring the lobes 74, 76, 78 into engagement with the cam follower 86 in the proper sequence thereof corresponding to the desired pattern of the stack to be formed on the load bed 56 of the bale wagon 10. Heretofore, such activating means were constituted by the components forming the load position sensing and activating means being illustrated, described, and designated generally by numeral 144, in aforementioned U.S. Pat. No. 3,927,771.

The bale wagon 10 disclosed herein incorporates improved means in the form of electro-mechanical apparatus which periodically activates the cam plate 72 so as to more consistently facilitate accurate selection of the desired sequence of tier patterns which will comprise the stack to be formed by the bale wagon and to do so under a wider range of crop conditions than the load position sensing and activating apparatus of U.S. Pat. No. 3,927,771. The electro-mechanical apparatus, generally designated by the numeral 88 and portions of which are shown in each of FIGS. 3 through 9 no longer utilizes the cable drum and motion transmitting cable of the prior apparatus which translated load bed rolling rack movement and position into cam plate rotation and angular position relative to the cam follower. Instead, the electro-mechanical apparatus provided by the present invention effectuates desired rotation of the cam plate 72 relative to the cam follower 86 whenever complete pivotal movement of the second table 20 from its lower, to its upper and back to its lower position is sensed.

Figure 5:
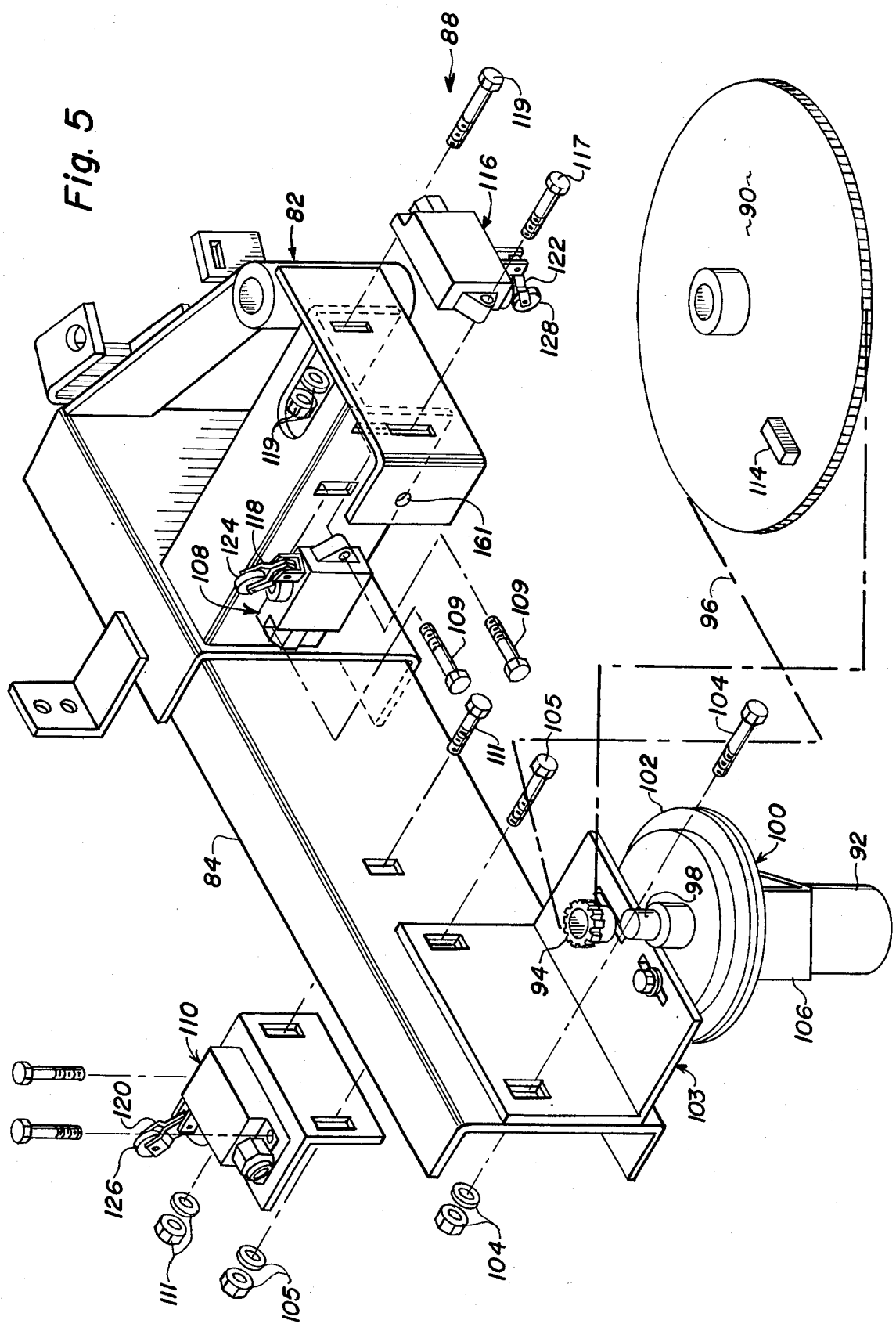
FIG. 5 is an enlarged, exploded perspective view of various electro-mechanical components for controlling the successive disposal of the cam follower of FIG. 4 at each of its successive positions along the lobes of the cam, located below the second table of the bale wagon of FIG. 1, as seen when standing along the left side of the wagon.
Figure 6:
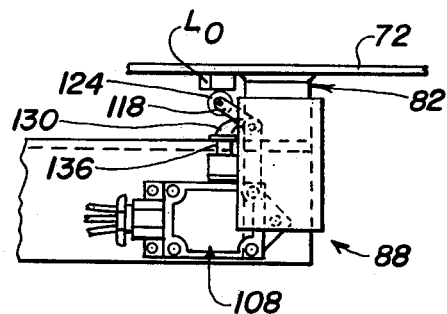
FIG. 6 is a fragmentary left side elevational view, showing a cam switch of the electro-mechanical components of FIG. 5 mounted under the cam of FIGS. 3 and 4.

Referring to FIGS. 3 and 5, the electro-mechanical apparatus 88 includes components for rotating the cam plate 72 in the form of a driven sprocket 90 fixed on the lower end of the shaft 80 opposite from the upper end thereof on which the cam plate 72 is adjustably mounted, an electric motor 92, a drive sprocket 94 operatively interconnected to the output shaft (not shown) of the motor 92 and a drive chain 96 extending between and about the sprockets 90, 94 so as to drivingly interconnect the same. More particularly, the drive sprocket 94 is fixed on the upper end of an output drive shaft 98 of a gearbox 100 and aligned in the horizontal plane of the driven sprocket 90. The gearbox housing 102 is adjustably fixed to the bottom side of the horizontal leg of a right-angle bracket 103 being attached at its vertical leg by fastener assemblies 104, 105 to the rear side and adjacent the left end of the transverse frame member 84. A U-shaped bracket 106 depends from the gearbox housing 102 and mounts therebelow the electric motor 92. The output shaft (not shown) of the motor 92 is coupled to an input shaft (not shown) of the gearbox which, in turn, is operatively coupled through suitable speed reduction gears (not shown) contained within the housing 102 to the output shaft 98 of the gearbox 100.

Consequently, whenever the electric motor 92 is energized, the drive sprocket and shaft 94, 98 rotate in a clockwise direction, as viewed in FIG. 5, and, via chain 96, thereby concurrently rotate driven sprocket 90, shaft 80 and cam plate 72 in a clockwise direction, as viewed in FIG. 3. The motor 92 is of the permanent magnet type and may be the one commercially available from the American Bosch Electrical Products Division of AMBAC Industries, Inc., designated by Part No. M0661124A.

The electro-mechanical apparatus 88 further includes components for energizing and de-energizing the electric motor 92 so as to cause rotation of the cam plate 72 through precise angular displacements relative to the cam follower 86 in response to pivotal movement of the second table 20. Such components are constituted by a series of ten blocks or lugs, respectively designated by references $L0$ through $L9$, being mounted on, and depending from, the lower surface of the cam plate 72 at predetermined, spaced apart positions (FIG. 4) located at the same radial distance from the axis of the cam plate 72 and shaft 80, a first switch 108 (FIGS. 5 and 6) mounted on the support assembly 82 by fastener assemblies 109 so as to be positioned below the cam plate 72 and adjacent the circular path traversed by the lugs when the cam plate 72 is rotated, a second switch 110 (FIGS. 5 and 7) mounted to transverse frame member 86 by fastener assemblies 105, 111 so as to be positioned at an intermediate location along the front side of the member 84, a trip mechanism 112 (FIGS. 3 and 7) for actuating the second switch 110 each time the second table is fully cycled, a block or lug 114 (FIGS. 5 and 8) mounted on, and projecting upwardly from, the upper surface of the driven sprocket 90, a third switch 116 (FIGS. 5 and 8) also mounted on the support assembly 82 by fastener assemblies 117, 119 so as to be positioned above the driven sprocket 90 and adjacent the circular path traversed by the lug 114 when the driven sprocket 90 is rotated, and electrical circuitry (FIG. 9) which electrically connects the electrical motor 92 and the first, second and third switches 108, 110, 116. Each of the switches is of the single pole, double throw type and may be the one commercially available from the Micro Switch, a division of Honeywell, Inc., designated as Part No. BAF1-2RN2-RH.

The switches 108, 110, 116 include respective pivotal arms 118, 120, 122 which at their outer ends rotatably mount respective rollers 124, 126, 128 and also at intermediate locations therealong mount abutment elements 130, 132, 134. Depressible buttons 136, 138, 140 are mounted on the switches 108, 110, 116 in alignment with paths of movement of the respective abutment elements 130, 132, 134. When the respective rollers 124, 126, 128 are engaged and depressed toward the switches which concurrently therewith pivots the respective arms 118, 120, 122 toward the switches, each of the abutment elements engages and depresses its respective button which changes the pole within the switch from one position to the opposite position. The arms 118, 120, 122 are biased away from the respective switches and thereby assure respective undepressed or released positions when their respective rollers are released. Likewise, the buttons 136, 138, 140 are biased to normally assume respective undepressed positions when the arms and rollers are in released positions wherein the abutment elements 130, 132, 134 are spaced from the respective buttons 136, 138, 140.

The roller 124 on the arm 118 of the first or cam switch 108 is positioned within the path traversed by the lugs on the cam plate 72 and is thereby adapted to be depressed when one of the lugs $L0$ through $L9$ is brought into engagement with the roller 124 upon rotation of the cam plate 72.

The roller 126 on the arm 120 of the second or trip switch 110 is positioned within the arcuate path transversed by a finger-like element 142 of the trip mechanism 112 and is thereby adapted to be depressed when the element 142 is brought into engagement with the roller 126 upon the second table 20 beginning its return trip back to its horizontal position after fully reaching its upper, vertical position. The trip mechanism 112 is incorporated into the second table return trip which is generally indicated by the numeral 144 in FIG. 4.

The second table return trip is completely illustrated and described in detail (being designated by the numeral 384) in aforementioned U.S. Pat. No. 3,945,507. Its cooperative action with other second table actuating linkage is described in great detail in the aforesaid patent. Suffice it to say for present purposes that as the second table 20 pivots toward its upper position, the second table return trip 144 will insure that the second table valve (not shown), which controls actuation of second table hydraulic cylinder 48, is reversed upon the second table 20 reaching its desired upper position so that the second table 20 is allowed to return by gravity to its lower position.

Briefly, the second table return trip 144 includes a transverse shaft 146 being rotatably mounted at its opposite right and left ends by brackets 148 (only the right one being shown in FIGS. 3 and 7) fixed respectively to the transverse frame member 84 and left longitudinal rail 12. A bent arm 150 is fixed to the shaft 146 near its right end and has a rear portion 152 which extends upwardly and rearwardly therefrom and a front portion 154 which extends downwardly and forwardly from the shaft 146. A spring 156 is connected between the rear portion 152 of the arm 150 and the right bracket 148, biasing the arm 150 and thus the shaft 146 toward counterclockwise rotation, as viewed in FIG. 3 (or clockwise rotation as viewed in FIG. 7); however, one end of a flat piece 158 fixed to the shaft 146 near its left end engages the top of the left rail 12 to limit such rotation of the shaft 146.

The trip 144 also includes a generally J-shaped arm 160 pivotally mounted at its lower end to the support assembly 82 at 161 (FIG. 5). A link rod 162 interconnects a tab 164 on rear portion 142 of the arm 150 on shaft 146 with the J-shaped arm 160. As the second table 20 reaches its upper position, as seen in FIG. 3, it brings a U-shaped rod 166, fixed to, and depending from, the arm portion 52 thereof, into engagement with the upper end of the J-shaped arm 160 and causes a slight amount of clockwise rotation of the arm 160 which, in turn, rotates the shaft 146 via the link rod 162 and arm 150.

Figure 7:
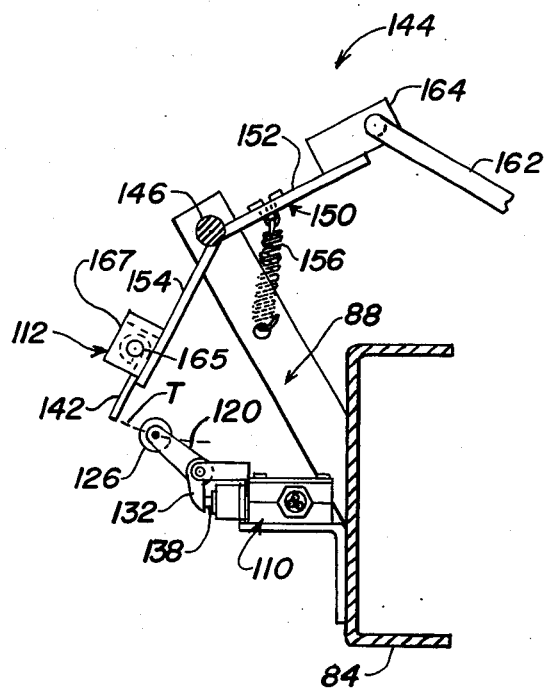
FIG. 7 is a fragmentary left side elevational view, showing a reset switch of the electro-mechanical components of FIG. 5 mounted above the driven sprocket for the cam.
Figure 8:
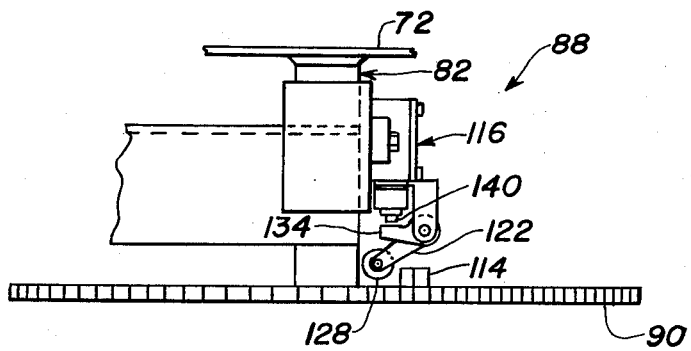
FIG. 8 is a fragmentary left side elevational view, showing a trip switch of the electro-mechanical components of FIG. 5 mounted below a trip finger on the second table actuating mechanism of FIG. 3.

Referring to FIG. 7, such slight counterclockwise rotation of the shaft 146 moves the trip mechanism 112 and hence the bent arm 150 and its finger-like element 142 in a rearward direction along path T sufficiently enough to engage the left side of the roller 126 and deflect the element 142 in a clockwise direction, as viewed in FIG. 7, until the element passes to the right of roller 126. The finger-like element 142 is rotatably mounted about a horizontal axis disposed parallel to the axis of shaft 146 by a pin 165 mounted on a bracket 167 fixed on the lower end of the front portion 154 of the bent arm 150. Once the second table 20 reaches its upper position, it begins to return by gravity toward its lower position. the finger-like element 142 once again engages the right side of the roller 126. However, this time, instead of the element 142 defecting or pivoting counterclockwise about pin 165 so as to pass the roller 126, it is prevented from pivoting due to its abutment against the lower edge of the bent arm 150. Therefore, the forward movement of the element 142, in being carried with the front portion 154 of the bent arm 150, causes depression of the roller 126. such depression of roller 126, which, in turn, causes depression of trip switch button 138, is only momentary in duration since upon immediate return movement of the second table 20, the U-shaped rod 166 moves rearwardly and J-shaped arm 160, due to the action of spring 156, pivots downwardly and both shaft 146 and arm 150 return rotate clockwise, as viewed in FIG. 7, to relatively quickly move finger-like element 142 forwardly and out of engagement with the depressed trip switch roller 126.

The roller 128 on the arm 122 of the third or reset switch 116 is positioned within the path traversed by the lug 114 on the driven sprocket 90 and is thereby adapted to be depressed when the lug 114 is brought into engagement therewith during the rotation of the driven sprocket 90. The relationship between the position of the lug 114 on the driven sprocket 90 and the respective positions of the lugs on the cam plate 72 and the purpose for the provision of the lug 114 and reset switch 116 will be described later.

Turning to the electrical circuitry of FIG. 9 associated with the switches 108, 110, 116, there is schematically illustrated a toggle switch 168 which is located in the cab 16 of the bale wagon 10. The toggle switch 168 is of the double pole, double throw, center off type and may be the one commercially available from Cole-Hersee Co., designated as Part No. 551846. The toggle switch 168 may be manually placed in either one of three different positions by the operator moving lever 170, namely, 37 on," "off" or "reset" positions. In the "off" position of the lever 170 of the toggle switch 168, the double pole of the switch 168 is located in a center position in which a center pair of terminal 172, 174 are not connected to either a right pair of terminals 176, 178 or a left pair of terminals 180, 182. When the lever 170 of the toggle switch 168 is moved to the "on" position, the double pole of the switch 168 is moved to a right position, as represented by the pair of solid lines arrows in FIG. 9, in which the center pair of terminals 172, 174 are electrically interconnected to the right pair of terminals 176, 178. When the lever 170 of the toggle switch 168 is moved to the "reset" position, the double pole of the switch 168 is moved to a left position, as represented by the pair of broken line arrows in FIG. 9, in which the center pair of terminals 172, 174 are electrically interconnected to the left pair of terminals 180, 182.

The upper center terminal 172 of the switch 168 is connected to a suitable source of electrical power PS on the bale wagon 10, such as the bale wagon's battery and/or generator, by conductor lines 184 through the bale wagon's ignition switch IS. The upper right terminal 176 of the switch 168 is connected to an upper terminal 186 of the cam switch 108 by conductor lines 188. Also, a lower terminal 190 of the trip switch 110 is connected in parallel with the upper terminal 186 of the cam switch 108 by a conductor line 192 which interconnects the lower terminal 190 and one of the lines 188. The upper left terminal 180 of the toggle switch 168 is connected to an upper terminal 194 of the reset switch 116 by a conductor line 196. A lower terminal 198 of the cam switch 108 is connected to a center terminal 200 of the trip switch 110 by a conductor line 202. A center terminal 204 of the reset switch 116 is connected to one terminal 205 of the permanent magnet type motor M (also designated by numeral 92) by conductor lines 206. A lower terminal 208 of the reset switch 116 is dead. A center terminal 210 of the cam switch 108 is also connected to the same terminal 205 of the motor M as the center terminal 204 of the reset switch 116 by a conductor line 212 which interconnects center terminal 210 and one of the lines 206. The other terminal 213 of the motor M is grounded at 214 by a conductor line 216. An upper terminal 218 of the trip switch 110 is connected to ground location 214 through variable resistor 220 by a conductor line 222 being connected to the resistor 220 which, in turn, is connected to the line 216. The purpose for the provision of the variable resistor 220 will be explained later.

Referring again to FIG. 4, there exists a predetermined relationship of the lugs $L0$ through $L9$ on the cam plate 72 with the sequence of lobes 74, 76, 78 on the cam plate 72. As will be explained in further detail later, whenever the cam switch roller 24 is engaged and held in depressed position by one of the lugs $L0$ through $L9$ on the cam plate 72 during the normal operation of the bale wagon 10 in building a stack on its load bed 56, the electric motor 92 is de-energized and the cam plate 72 is stationary. Consequently, in order to insure that the cam follower 86 will be successively positioned on the proper sequence of lobes 74, 76, 78 to insure formation of the desired one of the four stack patterns, the respective angular displacements between lugs $L0$ through $L9$ are proportionate to the respective angular displacements between the desired positions $P0$ through $P9$ of the cam follower 86 in each of which it is located along and in contact with one of the respective lobes 74, 76, 78 about the periphery of the cam plate 72, as illustrated in FIG. 4. Therefore, when the cam switch roller 124 is successively depressed by the cam plate lugs $L0$ through $L9$, the cam follower 86 is successively centered at positions $P0$ through $P9$ along the FIG. 4 sequence of outer, intermediate and inner lobes 74, 76, 78 about the periphery of the cam plate 72.

OPERATION OF THE ELECTRO-MECHANICAL MEANS FOR ACCURATE TIER PATTERN SEQUENCE SELECTION

The preferred stack pattern of FIG. 2 is represented by position E-ABC marked on the cam plate 72. This stack pattern was designated by the letter B in aforementioned U.S. Pat. No. 3,945,507. The three alternative stack patterns were designated as A, C and D. The differences between these four stack patterns are described in detail in the aforesaid patent and need not be repeated here. Suffice it to say that except for the side orientations (on flat or on edge) of the bales in their first and second tiers up from the bottom of the stacks, the patterns A and B are identical. Also, except for the side orientations of the bales in the first and second tiers up from the bottom of the C pattern stack, the latter is identical in its first seven tiers to all seven tiers of the A and B pattern stacks. The C stack has eight tiers, with the eighth tier being in the standard tier pattern. The second through eighth tiers of the D pattern stack are identical to all seven tiers of the A pattern stack. The D pattern stack has two extra tiers, a standard pattern first tier and a standard pattern ninth tier.

Since the electro-mechanical apparatus 88 provided by the present invention effectuates the desired rotation of the cam plate 72 relative to the cam follower 86 instead of the load position sensing and activating apparatus of U.S. Pat. No. 3,927,771, the particular side orientation (and thus the specific width) of the bales in the tier pattern to be formed has no effect on the position of the cam follower 86 about the periphery of the cam plate 72. Therefore, stack patterns A, B and C have the same starting position, that being bracketed area E-ABC on the cam plate 72 or contact position $P0$ of the cam follower 86 with the cam plate 72. The cam follower 86 is at such position when the cam switch roller 124 is depressed by lug $L0$. Stack pattern D has its starting position along and in contact with bracketed area E-D on the cam plate 72 or contact position $P9$ of the cam follower 86 with the cam plate 72. The cam follower 86 is at such position when the cam switch roller 124 is depressed by lug $L9$.

Assuming that the operator has chosen to build stack pattern B of FIG. 2 on the bale wagon 10, the first step to be taken is to adjust the cam plate 72 so that it will be set to the appropriate starting position to form the desired stack pattern B.

To set the cam plate 72 to the appropriate starting position, that being where the cam follower 86 is in contact with the first one of the outer lobes 74 at position E-ABC, the operator turns on the ignition switch IS and then throws the lever 170 of the toggle switch 168 located in the cab 16 to its "reset" position. Referring to FIG. 9, it will be seen that the electric motor 92 will be activated or energized to cause rotation of the large sprocket 90, and thereby the cam plate 72, in a clockwise direction until lug 114 on sprocket 90 engages and depressed the roller 128 on reset switch 116.

Specifically, when the toggle switch lever 170 is manually moved from its "off" to its "reset" position, the double pole of the switch 168 is moved from its center off position to its left position, as represented by the pair of broken line arrows in FIG. 9, in which the center pairs of terminals 172, 174 are respectively electrically interconnected to the left pair of terminals 180, 182. Once each interconnection is completed, the cam plate drive motor 92 will be energized even though the cam switch roller 124 is depressed by one of the lugs on the cam plate 72 which normally maintains the motor 92 in de-activated or de-energized condition.

Specifically, completion of such interconnection closes the electrical circuit from the electrical power source PS along conductor lines 184 to left terminal 180 and therefrom along conductor line 196 to upper terminal 194 of the reset switch 116. The single pole of reset switch 116 is disposed so as to electrically interconnect upper terminal 194 with center terminal 204, as represented by the solid line arrow in FIG. 9, when the reset switch roller 128 is not engaged with and thus depressed by the lug 114 on the large sprocket 90, as shown in solid line form in FIG. 9. In other words, when reset switch roller 128 is in its released position, the single pole of reset switch 116 electrically interconnects upper terminal 194 with center terminal 204. Finally, the center terminal 204 of the reset switch 116 is electrically connected to the motor 92 by conductor lines 206.

It should be noted here that momentarily with the above-described energization of motor 92 some electrical energy is also routed along an auxiliary electrically closed circuit which exists from conductor line 206, along conductor line 212 to cam switch 108, therefrom to and through trip switch 110, and finally therefrom along conductor line 222 through the variable resistor 220 to the ground location 214. However, the presence of resistor 220 insures that not all of the electrical power will be drained off along this circuit which otherwise would prevent energization of the motor 92. The reason why this latter circuit is momentarily closed is because cam switch roller 124 would normally be in its depressed position being engaged by one of the cam plate lugs. Such depressed position of the cam switch roller 124, as shown in broken line form in FIG. 9, means that the single pole of the cam switch 108, as represented by the broken line arrow in FIG. 9, electrically interconnects its center terminal 210 with lower terminal 198. Thus, conductor 212 and 202 are electrically interconnected by the cam switch pole. Furthermore, the trip switch roller 126 would normally be in its released position, as seen in solid line form in FIG. 9, which means that the single pole of the trip switch 110, as represented by the solid line arrow in FIG. 9, electrically interconnects its center terminal 200 with upper terminal 218. Thus, conductor lines 202 and 222 are electrically interconnected by the trip switch pole.

Once motor 92 is energized, small sprocket 94 rotates and through chain 96 rotates large sprocket 90 and therewith cam plate 72. Almost instantaneously thereafter, the particular lug which was depressing cam switch roller 124 is moved relative to and thus off the roller 124. The roller 124 then moves to its released position, as seen in solid line form in FIG. 9, which changes the single pole of the cam switch 108 to its position as represented by the solid line arrow in FIG. 9. Now the circuit from conductor line 206 and along conductor line 212 to conductor line 202 is broken or opened. It will be understood that as the motor 92 continues to cause rotation of the cam plate 72 several of the other lugs may momentarily engage and depress the cam switch roller 124 as they move past it. This has the effect of again momentarily closing the above mentioned auxiliary circuit. However, again, the presence of resistor 220 insures that such will not adversely affect the continuing energization of the motor 92 and thus rotation of the cam plate 72.

Finally, the single lug 114 on the rotating large driven sprocket is brought into engagement with and depresses the reset switch roller 128. Upon movement of the roller 128 to its depressed position, which is seen in broken line form in FIG. 9, the single pole of the reset switch 116 changes to its position as represented by the broken line arrow in FIG. 9. Now the circuit from conductor line 196 to the conductor line 206 is broken or opened and the cam drive motor 92 is thereby de-energized or rendered inoperative.

The cam plate 72, of course, stops when the motor 92 is de-energized. Once it stops, the toggle switch lever 170 is manually moved from the "reset" position back to its "off" position. In so doing, the double pole of the control switch 168 is moved back to its center off position.

If the cam plate 72 is in proper alignment for forming either the A, B or C stack patterns, the cam follower 86 should not be contacting the cam plate 72 in the area of position E-ABC with the cam plate lug $L0$ generally centered on, engaged with and depressing the roller 124 on the cam switch arm 118. If the cam follower 86 and the cam plate lug $L0$ are not in such respective positions, capscrews 224 which fasten the cam plate 72 onto the shaft 80 are loosened and the cam plate 72 slightly rotated relative to shaft 80 until the cam follower 86 and cam plate lug $L0$ are disposed in their desired respective positions relative to position E-ABC and cam switch roller 124. (To form the D stack pattern, the cam plate 72 would be rotated so as to align the cam follower 72 with starting position E-D and the cam switch roller 124 with cam plate lug $L9$.) Then, the capscrews 224 are retightened to secure the cam plate 72 back on the shaft 80. After such slight adjustment, the large sprocket lug 114 should still be engaged with and depressing reset switch roller 128.

Now the cam plate 72 is set up to command the formation of the B stack pattern (or, for that matter, the A or C stack pattern depending upon which bale side the first and second tiers are to be formed on).

Just prior to moving the bale wagon 10 across the field in the commencement of normal stack forming operation, the toggle switch lever 170 is manually moved by the operator from the "off" position to its "on" position. In so doing, the double pole of the control switch 168 is moved from its center off position to its right position, as represented by the pair of solid line arrows in FIG. 9, in which the center pair of terminals 172,174 are respectively electrically interconnected to the right pair of terminals 176,178. Even though such interconnection is completed, the cam plate drive motor 92 will still not be energized.

Specifically, referring to FIG. 9, the electrical circuit from upper terminal 176 of control switch 168, along conductor lines 188, to conductor lines 212,206 and therefrom to the motor 92 is open or broken through cam switch 108, since the single pole of cam switch 108 is in its lower broken line position to the cam switch roller 124 being held in its broken line depressed position by cam plate lug $L0$. Further, the electrical circuit from conductor line 188, to conductor line 192 and along conductor line 202 through cam switch 192 and therefrom via conductor lines 212,206 to motor 92 is open or broken through the trip switch 110, since the single pole of trip switch 110 is in its upper solid line position due to trip switch roller 126 being in its solid line released position.

The bale wagon 10 is now moved across the field and bales are successively picked up and formed into a standard tier pattern on the second table 20. Upon completion of formation of the tier on the second table 20, the second table 20 is actuated to pivot upwardly generally 90° to a generally vertical position adjacent the load bed 56 which delivers the tier of bales to the front end of the load bed. Then, the second table 20 pivotally returns to its lower, generally horizontal position. Tier formation and second table actuation operations are fully illustrated and described in aforementioned U.S. Pat. No. 3,945,507.

Full pivotal cycling of the second table 20 to its vertical position and return back to its horizontal position in delivering the tier to the load bed 56 energizes the drive motor 92 and initiates rotation of the cam plate 72 in a clockwise direction, as viewed in FIG. 4.

Specifically, concurrently as the second table 20 begins its downward descent after it reaches its uppermost position, as explained hereinabove, finger-like element 142 of trip mechanism 112, which had moved to the rear (or right) of trip switch roller, now moves in forward direction along path T and engages and depresses trip switch roller 126. The single pole of the trip switch 110 is changed to its lower broken line position which electrically interconnects conductor lines 192 and 202 through the trip switch 110. Consequently, a closed electrical circuit now extends from the electrical power source PS through the control switch 168 from right terminal 176 thereof, along conductor line 188, to conductor line 192, through trip switch 110 to conductor line 202 and therefrom to the motor 92 via conductor lines 212,206 and the single pole of cam switch 108 which electrically interconnects conductor lines 202,212.

However, the energization of drive motor 92 and rotation of cam plate 72 would be short-lived if such depended solely on the actuation of the trip switch 110 since depression of the roller 126 on trip switch 110 is only momentary in duration. But, even though the energization of the drive motor 92 lasts for only a short duration, a matter of a few seconds, such period is long enough to rotate the cam plate 72 sufficiently to remove the cam plate lug $L0$ from cam switch roller 124 and thus allow it to move to its released position, as seen in solid line form in FIG. 9. The single pole of the cam switch 108 is then changed to its upper solid line position which electrically interconnects conductor lines 188 and 212 through the cam switch 108. Now, a closed electrical circuit extends from the electrical power source PS through the control switch 168 from right terminal 176 thereof, along conductor line 188 through cam switch 108 to conductor line 212 and therefrom to the motor 92 via conductor line 206. Consequently, it is of no importance relative to continued energization of motor 92 and rotation of cam plate 72 that the above-described closed electrical circuit through the trip switch 110 is again opened as soon as its roller 126 is released from the finger-like element 142.

The cam drive motor 92 continues to be energized via the closed electrical circuit through cam switch 108 whereby clockwise rotation of the cam plate 72 continues and brings the next successive cam plate lug $L1$ toward and into engagement with the cam switch roller 124 and changes the disposal of the cam follower 86 along the cam plate periphery from position $P0$ at E-ABC to position $P1$, both of which are along the outer lobe 74 of the cam plate 72.

When lug $L1$ engages and depresses the cam switch roller 124, the previously closed circuit through the cam switch 108 is broken or opened and the motor 92 is de-energized and the rotation of the cam plate 72 terminates. The variable resistor 220 functions as an electric brake which serves to stop the motor 92 dead, i.e., prevent inertial forces from causing the output shaft of the motor to gradually slow its rotation and sort of drift to a stop. Such situation would cause the cam plate 72 to continue its rotation and its lug $L1$ to overrun the cam switch roller 124. Thus, the variable resistor 220 insures that the cam plate 72 substantially instantaneously terminates its rotation as its intended lug becomes centered on the cam switch roller 124.

The above-described energization of motor 92 and rotation of cam plate 72 to the next successive position occurs during the period of time it takes the second table 20 to fully pivotally return back to its generally horizontal position. Consequently, there is no interruption in the movement of the bale wagon across the field.

Again, bales are successively picked up and formed into another standard tier pattern on the second table 20, considering that the cam follower 86 is still disposed along the outer lobe 74 of the cam plate which represents the standard tier pattern. Once formation of the tier of bales is completed and the second table 20 pivots rearwardly to deliver the tier to the front end of the load bed 56 and then begins its return trip, the trip switch roller 126 will again be depressed which initiates repetition of the above-described steps for rotating the cam plate 72 such that the cam follower 86 is disposed at the next successive position $P2$ along lobe 76 of the cam plate 72.

The above-described operations are repeated to successively dispose the cam follower 86 at remaining successive positions $P3$ through $P7$ upon successive depression of cam switch roller 124 by cam plate lugs $L3$ through $L7$ following successive formation of each of the remaining five tiers of bales and delivery thereof to the load bed 56. Once, the seventh tier has been formed and delivered to the load bed 56 to complete formation of the B stack pattern of FIG. 2, the toggle switch lever 170 of control switch 168 is manually moved by the operator from the "on" position to its "reset" position which effectuates further clockwise rotation of the cam plate 72 until the lug 114 on the large driven sprocket 90 engages and depresses reset switch roller 128, as has been explained hereinabove in connection with the description of the steps required to set up the cam plate 72 in its proper starting position. Now the cam plate 72 is ready to build another stack of bales on the bale wagon 10 once the stack just completed thereon has been unloaded therefrom.

OTHER COMPONENTS FOR FACILITATING TIER PATTERN SEQUENCE SELECTION

Several other improvements are provided in the bale wagon 10. These are other components preferably incorporated in the bale wagon 10 in conjunction with the improved electro-mechanical apparatus just described for facilitating the carrying out of adjustments to the apparatus should any malfunction thereof occur or for some other purpose.

One of these components is a manual push button switch 226 which is located in the cab 16 and when used enables the operator to rotate the cam plate 72 to dispose the cam follower 86 at any one of its various positions along the cam plate periphery. The switch 226 may be the one commercially available from Cole-Hersee Co., designated as Part No. 9207-01.

One terminal 228 of the switch 226 is connected by conductor line 230 to conductor line 184. The other terminal 232 of the switch 226 is connected by conductor line 234 to conductor line 206. The switch 226 is biased to normally assume its solid line released position, as seen in FIG. 9, in which the electrical circuit from the power source PS to the motor 92 is open or broken through the switch 226. When the push button of the switch 226 is depressed manually by the operator, the terminals 228,232 are electrically interconnected and the aforementioned electrical circuit is closed, whereby the motor 92 is energized and the cam plate 72 rotated.

Should the control toggle switch lever 170 be located at its "off" position, the motor 92 will stay energized only so long as the push button cam cycle switch 226 remains depressed. However, when the control switch lever 170 is at its "on" position, the push button switch 226 need only be depressed momentarily and then released to cause the cam plate 72 to rotate enough to remove the respective cam plate lug from the cam switch roller 124 and thus allow the roller to move to its released position. A closed circuit then exists through the cam switch 108 which continues the energization of the motor 92 and rotation of the cam plate 72 until the cam follower 86 becomes disposed adjacent the next successive one of the positions on the cam plate 72. Thus, it is seen that the same result is achieved with the manual depression and then release of the push button switch 226 as is achieved when the trip switch roller 126 is momentarily depressed and then released, which has been adequately explained hereinabove.

Another component is a tier counter 236 which is located in the cab 16 and automatically keeps track of the number of tiers which have been formed on the second table 20 and delivered to the load bed 56. The tier counter 236 is incorporated into the circuitry of FIG. 9 so as to be controlled by the operation of the cam switch 108. The tier counter 236 may be the one commercially available from Landis & Gyr, Inc., designated as Part No. ES2200SP. Yet another component, being associated with the tier counter 236, is a tier counter reset push button switch 238 which is also located in the cab 16 and may be electrically closed to advance the count on the tier counter 236 one number at a time in order to return its count into correspondence with the position of the cam follower 86 along the cam plate 72 and thus with the actual number of tiers standing on the load bed 56 should for some reason they get out of synchronization with one another. The same commercially available component used for the cam cycle push button switch 226 may be used for the tier counter reset push button switch 238.

It was mentioned above that the tier counter 236 is incorporated into the circuitry of FIG. 9 so as to be controlled by the operation of the cam switch 108. This is true regardless of whether the control toggle switch lever 170 is in its "on" or "reset" positions.

Specifically, the numerical indication terminal 240 of the tier counter 236 is interconnected to the lower center terminal 174 of the control switch 168 by conductor line 242 which interconnects counter terminal 240 with upper right terminal 244 of the tier counter reset push button switch 238, by conductor line 246 which interconnects control switch lower center terminal 174 with upper left terminal 248 of the tier counter reset switch 238, and finally by the switch 238 which is biased to normally assume its solid line released position, as seen in FIG. 9, wherein it interconnects its upper right and left terminals 244,248.

Furthermore, lower left terminal 182 and upper right terminal 176 of control toggle switch 168 are electrically interconnected by conductor line 250, while upper left terminal 180 and lower right terminal 178 are electrically interconnected by conductor line 252.

When the control toggle switch lever 170 is moved from its "off" position to its "reset" position, as explained hereinbefore, the double pole of the switch 168 is moved from its center off position to its left position, as represented by the pair of broken line arrows in FIG. 9, in which the center pair of terminals 172,174 are respectively electrically interconnected to the left pair of terminals 180,182. As explained above, such interconnection of the terminals of the control switch 168 closes the electrical circuit from the electrical power source PS to the cam drive motor 92 through the reset switch 116. However, such interconnection also completes the electrical circuit from the tier counter numerical indication terminal 240 to the upper terminal 186 of the cam switch 108 through the conductor line 250 which interconnects the lower left terminal 182 and upper right terminal 176 of the control switch 168. Then, as the cam plate 72 is rotated and each time the cam switch roller 124 is engaged and depressed and then released by a cam plate lug to respectively open and close the circuit from conductor line 206 through the cam switch 108, to the upper right terminal 176 of the control switch 168 and therefrom to the terminal 240 of the tier counter 236, along the circuit path described above, the tier counter's numerical indicator advances one count or number falling between zero to nine depending upon which cam plate lug depressed and then released the cam switch roller 124. The nature of the tier counter 236, being of the commercially available type designated hereinabove, is to advance one-half count each time the circuit to the counter 236 through the cam switch 108 is closed by the cam switch 108 and another one-half count each time it is opened. Consequently, each release and depression of the cam switch roller 124 by a successive pair of the cam plate lugs will advance the counter 236 a full number or count which will represent one tier being added to the load bed 56 during the normal operation of the bale wagon 10. There is one lug, $L8$, on the cam plate 72 which is much thinner than the rest of the lugs. Its purpose is to merely insure that the count on the tier counter 236 will have advanced back to zero when the cam plate 72 has reset such that its lug $L0$ holds cam switch roller 124 depressed and the cam follower 86 is disposed at position $P0$ along starting cam plate area E-ABC. The rotation of the cam plate 72 may overrun the cam switch roller 124 when the thin lug $L8$ engages and depresses the cam switch roller 124. However, whether rotation of the cam plate 72 is stopped or not by lug $L8$ makes no difference. This is because both positions $P8$ and $P9$ of the cam follower 86 are along the standard tier pattern lobe (first outer lobe 74) and only the eighth or last tier of the C stack pattern or the nineth or last tier of the D stack pattern could possibly be undergoing selection in order to complete these respective stacks when the cam follower 86 is along this region of the cam plate and such selection would be satisfactorily carried out regardless of whether the rotation of the cam plate 72 is stopped by lug $L8$ and $L9$.

When the control toggle switch lever 170 is moved from its "reset" position to its "on" position, as explained hereinbefore, the double pole of the switch 168 is moved from its left broken line position to its right solid line position in which the center pair of terminals 172,174 are respectively electrically interconnected to the right pair of terminals 176,178. As explained above, such interconnection of the terminals of the control switch 168 completes the electrical circuit from the electrical power source PS to the upper terminal 186 of the cam switch 108 and also to the lower terminal 190 of the trip switch 110. However, such interconnection also completes the electrical circuit from the tier counter numerical indication terminal 240 to the center terminal 210 of the cam switch 108 through the reset switch 116 and the conductor line 252 which interconnects the lower right terminal 178 and upper left terminal 180 of the control switch 168. When the cam plate 72 is stationary with the cam switch roller depressed, the above-described circuits, which if closed would interconnect the tier counter terminal 240 with the power supply, are open through the cam switch 108 since its single pole interconnects center terminal 210 with lower terminal 198. When the second table 20 cycles to deliver a tier to the load bed 56 and the trip switch roller 126 is depressed whereby the switch's center pole is changed to its FIG. 9 broken line position, the motor 92 is energized, as explained previously, and, also, the circuit path between the power supply PS and the tier counter terminal 240 is now closed via the trip switch 110 and the lower terminal 198 of the cam switch 108 momentarily until the cam plate lug moves off the cam switch roller 124. Once the latter happens, then the circuit path to the tier counter terminal 240 from the power supply is closed between upper and central terminals 186,210 of the cam switch 108. The counter 236 thereby advances one-half count. When the circuit path is broken upon the next successive lug on the rotating cam plate 72 engaging and depressing the cam switch roller 124, the counter 236 then advances another one-half count such that the numerical reading on the counter 236 has advanced one whole number or count. The same steps are repeated as the cam plate 72 is rotatably moved so as to dispose the cam follower 86 at each of the successive positions $P0$ through $P7$ during normal operation of the bale wagon to form the B stack pattern.

If it is desired to change or correct the numerical count on the tier counter 236, the push button of tier counter reset switch 238 is merely pressed and then released. This first closes and then opens a circuit extending between the power supply PS and the tier counter terminal 240 which completely bypasses the cam switch 108 and the control toggle switch 168. The ignition switch IS of the bale wagon 10 need only be turned on for the tier counter reset switch 238 to be operative. Specifically, depression of the push button of switch 238 interconnects its lower pair of terminal 254,256 which, in turn, interconnects conductor line 242 and conductor line 258. Release of the push button breaks such interconnection and re-interconnects upper terminals 244,248.

It should be mentioned that during periods when the bale wagon 10 is not in normal operation building a stack, it is advisable to return the control toggle switch lever 170 back to its "off" position. This is because the cam plate 72 cannot then be rotated by the second table return trip linkage. For instance, if the second table 20 is pivoted to and held at its upper position adjacent to and in contact with the front end of the stack on the load bed 56 to help stabilize it during transport to the storage location and then pivoted back to its lower position upon reaching the storage location, such movement of the second table 20 will have no effect on the position of the cam plate 72, if the lever 170 is in its "off" position. The same holds true where the second table is cycled for facilitating servicing of the bale wagon between or during field use.

It is thought that the invention and many of its attendant advantages will be understood from the foregoing description and it will be apparent that various changes may be made in the form, construction and arrangement of the parts of the improved electro-mechanical tier pattern sequence selection apparatus described without departing from the spirit and scope of the invention or sacrificing all of its material advantages, the form hereinbefore described being merely an exemplary embodiment thereof.

Having thus described its invention, what is claimed is:

1. In a bale wagon having operable means for forming bales into a plurality of tier patterns and means for storing a predetermined sequence of said plurality of tier patterns, said storing means defining a plurality of successive-displaced positions which each represent one of said tier patterns, said operable means responsive to each of said storing means positions to form the bales into the one of said tier patterns corresponding to each of said storing means positions, the improvement which comprises:
   a source of electrical power;
   electrical drive means activatable for rendering said operable means successively responsive to each of said storing means positions; and
   electro-mechanical means including
   circuitry interconnecting said electrical power source and said drive means for transmitting electrical energy from the former to the latter to activate the latter;
   first means for opening said circuitry in response to said operable means being rendered responsive to said predetermined one of said storing means positions so as to prevent the transmission of electrical energy to said drive means; and
   second means for selectively closing said circuitry so as to allow the transmission of electrical energy to said drive means to activate the same until said first means opens said circuitry when said operable means is rendered responsive to said predetermined one of said storing means positions.

2. A bale wagon as recited in claim 1, wherein said predetermined one of said storing means positions is the next successive one of said storing means positions following the one of said storing means positions to which said operable means was previously rendered responsive.

3. A bale wagon as recited in claim 1, wherein said predetermined one of said storing means positions is the one which constitutes a starting position.

4. In a bale wagon having operable means for forming bales into a plurality of different tier patterns, means for storing a predetermined sequence of said plurality of tier patterns, said storing means defining a plurality of successive-displaced positions which each represent one of said tier patterns, and means coupled to said operable means and associated with said storing means, said coupled and associated means responsive to each of said storing means positions to cause said operable means to form the bales into the one of said tier patterns corresponding to each of said storing means positions, the improvement which comprises:
   a source of electrical power;
   electrical drive means activatable for effectuating disposal of said coupled and associated means successively at each of said storing means positions; and
   electro-mechanical means including
   a movably-mounted drive transmission member operatively interconnecting said drive means with one of said storing means and said coupled and associated means and which upon activation of said drive means will move and thereby effectuate disposal of said coupled and associated means successively at each of said storing means positions, said transmission member having a first element which moves in a predetermined path as said transmission member is moved;
   circuitry interconnecting said electrical power source and said drive means which when closed transmits electrical energy from the former to the latter to activate the latter;
   control means selectively operable for electrically opening and closing said circuitry; and
   switch means mounted adjacent said drive transmission member and including a second element disposed in said path of said first element of said transmission member and movable from a first position to a second position by said first element such that when said circuitry is closed by said control means and said drive means is thereby activated, said switch means causes opening of said circuitry and thereby de-activation of said drive means when said first element is moved to said second position by said second element, said movement of said second element to said second position occurring concurrently as said drive transmission member effectuates disposal of said coupled and associated means at said predetermined one of said storing means positions.

5. A bale wagon as recited in claim 4, wherein said predetermined one of said storing means positions is the next successive one of said storing means positions following the previous storing means position of said coupled and associated means.

6. A bale wagon as recited in claim 4, wherein said predetermined one of said storing means positions is the one which constitutes a starting position.

7. In a bale wagon having means for accumulating tiers of bales into a stack, operable means for forming bales into a plurality of different tier patterns and for adding each tier to said tier-accumulating means, means for storing a predetermined sequence of said plurality of tier patterns, said storing means defining a plurality of successive-displaced positions which each represent one of said tier patterns, and means coupled to said operable means and associated with said storing means, said coupled and associated means responsive to each of said storing means positions to cause said operable means to form the bales into the one of said tier patterns corresponding to each of said storing means positions and to add said tier to said tier-accumulating means, the improvement which comprises:
   a source of electrical power;
   electrical drive means activatable for effectuating disposal of said coupled and associated means successively at each of said storing means positions; and
   electro-mechanical means including
   circuitry interconnecting said electrical power source and said drive means for transmitting electrical energy from the former to the latter to activate the latter;
   first means for opening said circuitry in response to the disposal of said coupled and associated means at each of said successive storing means positions so as to prevent the transmission of electrical energy to said drive means; and
   second means for closing said circuitry in response to the addition of each of said tiers of bales to said tier-accumulating means so as to allow the transmission of electrical energy to said drive means to activate the same until said first means again opens said circuitry when said coupled and associated means is disposed at said next successive one of said storing means positions.

8. A bale wagon as recited in claim 7, wherein said predetermined one position constitutes a starting position.

9. In a bale wagon having operable means for forming bales into a plurality of different tier patterns, a memory element for storing a predetermined sequence of said plurality of tier patterns, said memory element defining a plurality of successive-displaced positions which each represent one of said tier patterns and being comprised by a rotatable cam having a peripheral arrangement of lobes which define said plurality of successive positions, and means coupled to said operable means and associated with said rotatable cam, said coupled and associated means including a cam follower disposed adjacent said cam and engaged with one of said lobes thereof and being responsive to each of said positions defined by said lobes of said cam to cause said operable means to form the bales into one of said tier patterns corresponding to each of said cam positions, the improvement which comprises:

a source of electrical power;
electrical drive means activatable for rotating said cam relative to said cam follower for effectuating disposal of said cam follower successively at each of said positions defined by said lobes of said cam; and
electro-mechanical means including
circuitry interconnecting said electrical power source and said drive means for transmitting electrical energy from the former to the latter to activate the latter;
first means for opening said circuitry in response to disposal of said cam follower at said predetermined one of said positions defined by said lobes of said cam; and
second means for selectively closing said circuitry so as to allow the transmission of electrical energy to said drive means to activate the same until said first means opens said circuitry when said cam follower is disposed at said predetermined one of said positions defined by said lobes of said cam.

10. In a bale wagon having operable means for forming bales into a plurality of different tier patterns, a memory element for storing a predetermined sequence of said plurality of tier patterns, said memory element defining a plurality of successive-displaced positions which each represent one of said tier patterns and being comprised by a rotatable cam having a peripheral arrangement of lobes which define said plurality of successive positions, and means coupled to said operable means and associated with said rotatable cam, said coupled and associated means including a cam follower disposed adjacent said cam and engaged with one of said lobes thereof and being responsive to each of said positions defined by said lobes of said cam to cause said operable means to form the bales into the one of said tier patterns corresponding to each of said cam positions, the improvement which comprises:

a source of electrical power;
electrical drive means activatable for rotating said cam relative to said cam follower for effectuating disposal of said cam follower successively at each of said positions defined by said lobes of said cam; and
electro-mechanical means including
a rotatably-mounted drive transmission member operatively interconnecting said drive means with said cam and which upon activation of said drive means will rotate and, in turn, cause rotation of said cam and thereby effectuate disposal of said cam follower successively at each of said positions defined by said lobes of said cam, said transmission member having a first element which moves in a predetermined path as said transmission member rotates;
circuitry interconnecting said electrical power source and said drive means which when closed transmits electrical energy from the former to the latter to activate the latter;
control means selectively operable for electrically opening and closing said circuitry; and
switch means mounted adjacent said drive transmission member and including a second element disposed in said path of said first element of said transmission member and movable from a first position to a second position by said first element such that when said circuitry is closed by said control means and said drive means is thereby activated and rotates said transmission member which rotates said cam, said switch means causes opening of said circuitry and thereby de-activation of said drive means and termination of rotation of said transmission member and said cam when said second element is moved to said second position by said first element, said movement of said second element to said second position occurring concurrently as said drive transmission member effectuates disposal of said cam follower at said predetermined one of said positions defined by said lobes of said cam.

11. A bale wagon as recited in claim 10, wherein:
said transmission member is a sprocket;
said first element in an outwardly protruding lug mounted on said sprocket; and
said second element is arm means pivotally mounted in said first position on said switch means and yieldably movable to said second position upon being engaged by said lug on said sprocket, with the position of said lug along its path where it engages said arm means being reached concurrently as said drive means through said sprocket effectuates disposal of said cam follower at said predetermined one of said positions defined by said lobes of said cam.

12. In a bale wagon having operable means for forming bales into a plurality of different tier patterns, a memory element for storing a predetermined sequence of said plurality of tier patterns, said memory element defining a plurality of successive-displaced positions which each represent one of said tier patterns and being comprised by a rotatable cam having a peripheral arrangement of lobes which define said plurality of successive positions, and means coupled to said operable means and associated with said rotatable cam, said coupled and associated means including a cam follower disposed adjacent said cam and engaged with one of said lobes thereof and being responsive to each of said positions defined by said lobes of said cam to cause said operable means to form the bales into the one of said tier patterns corresponding to each of said cam positions, the improvement which comprises:

a source of electrical power;
electrical drive means activatable for rotating said cam relative to said cam follower for effectuating disposal of said cam follower successively at each of said positions defined by said lobes of said cam; and electro-mechanical means including a series of first elements on said cam successively displaced one from the next in proportion to said successive displacements between said positions defined by said lobes of said cam and which move in a predetermined path as said cam rotates;

circuitry interconnecting said electrical power source and said drive means which when closed transmits electrical energy from the former to the latter to activate the latter;

control means selectively operable for electrically opening and closing said circuitry; and switch means mounted adjacent said cam and including a second element disposed in said path of said first elements on said cam and movable from a first position to a second position by each of said first elements such that when said circuitry is closed by said control means and said drive means is thereby activated and rotates said cam, said switch means causes opening of said circuitry and thereby deactivation of said drive means and termination of rotation of said cam each time said second element is moved to said second position by one of said first elements, said movement of said second element to said second position occurring concurrently as said rotation of said cam effectuates disposal of said cam follower at a respective one of said positions defined by said lobes of said cam.

13. A bale wagon as recited in claim 12, wherein:
each of said first elements is an outwardly protruding lug mounted on said cam; and
said second element is arm means pivotally mounted in said first position on said switch means and yieldably movable to said second position upon being engaged by one of said lugs on said cam, with the position of each of said successive lugs along their path where it engages said arm means being reached concurrently as said drive means effectuates disposal of said cam follower at a respective one of said positions defined by said lobes of said cam.

14. A bale wagon as recited in claim 12, wherein:
said bale wagon includes means for accumulating said tiers;
said operable means is also for adding each tier to said tier-accumulating means; and
said control means includes trip means for closing said circuitry in response to the addition of each of said tiers of bales to said tier-accumulating means so as to allow the transmission of electrical energy to said drive means to activate the same until said switch means again opens said circuitry when said cam follower is disposed at said next successive one of said positions defined by said lobes of said cam.

15. In a bale wagon having means for accumulating tiers, operable means for forming bales into a plurality of different tier patterns and for adding each tier to said tier-accumulating means, a memory element for storing a predetermined sequence of said plurality of tier patterns, said memory element defining a plurality of successive-displaced positions which each represent one of said tier patterns and being comprised by a rotatable cam having a peripheral arrangement of lobes which define said plurality of successive positions, and means coupled to said operable means and associated with said rotatable cam, said coupled and associated means including a cam follower disposed adjacent said cam and engaged with one of said lobes thereof and being responsive to each of said positions defined by said lobes of said cam to cause said operable means to form the bales into the one of said tier patterns corresponding to each of said cam positions, the improvement which comprises:

a source of electrical power;
electrical drive means activatable for rotating said cam relative to said cam follower for effectuating disposal of said cam follower successively at each of said positions defined by said lobes of said cam; and
electro-mechanical means including
circuitry interconnecting said electrical power source and said drive means for transmitting electrical energy from the former to the latter to activate the latter;
first means for opening said circuitry in response to the disposal of said cam follower at each of said successive positions defined by said lobes of said cam so as to prevent the transmission of electrical energy to said drive means; and
second means for closing said circuitry in response to the addition of each of said tiers of bales to said tier-accumulating means so as to allow the transmission of electrical energy to said drive means to activate the same until said first means again opens said circuitry when said cam follower is disposed at said next successive one of said positions defined by said lobes of said cam.

16. In a bale wagon having means for accumulating tiers of bales into a stack, means for accumulating bales into a tier and being movable through a predetermined cycle for delivering said tier to said tier-accumulating means, operable means for forming bales into a plurality of different tier patterns on said bale-accumulating means and for delivering each tier to tier-accumulating means, means for storing a predetermined sequence of said plurality of tier patterns, said storing means defining a plurality of successive-displaced positions which each represent one of said tier patterns, and means coupled to said operable means and associated with said storing means, said coupled and associated means responsive to each of said storing means positions to cause said operable means to form the bales into the one of said tier patterns corresponding to each of said storing means positions and to deliver said tier to said tier-accumulating means, the improvement which comprises:

a source of electrical power;
electrical drive means activatable for effectuating disposal of said coupled and associated means successively at each of said storing means positions; and
electro-mechanical means including
circuitry interconnecting said electrical power source and said drive means for transmitting electrical energy from the former to the latter to activate the latter;
first means for opening said circuitry in response to the disposal of said coupled and associated means at each of said successive storing means positions so as to prevent the transmission of electrical energy to said drive means; and
second means for closing said circuitry in response to said bale-accumulating means being moved through its predetermined cycle so as to allow the transmission of electrical energy to said drive means to activate the same until said first means again opens said circuitry when said coupled and associated means is disposed at said next successive one of said storing means positions.

* * * * *